(12) United States Patent
Delcheccolo et al.

(10) Patent No.: US 6,670,910 B2
(45) Date of Patent: Dec. 30, 2003

(54) NEAR OBJECT DETECTION SYSTEM

(75) Inventors: Michael Joseph Delcheccolo, Westford, MA (US); Mark E. Russell, Westford, MA (US); Walter Gordon Woodington, Lincoln, MA (US); Joseph S. Pleva, Londonderry, NH (US); John M. Firda, Andover, MA (US); H. Barteld Van Rees, Needham, MA (US)

(73) Assignee: Raytheon Company, Lexington, MA (US)

( * ) Notice: Subject to any disclaimer, the term of this patent is extended or adjusted under 35 U.S.C. 154(b) by 37 days.

(21) Appl. No.: 10/062,578

(22) Filed: Jan. 31, 2002

(65) Prior Publication Data

US 2002/0147534 A1 Oct. 10, 2002

Related U.S. Application Data

(63) Continuation-in-part of application No. 09/931,631, filed on Aug. 16, 2001.
(60) Provisional application No. 60/226,160, filed on Aug. 16, 2000.

(51) Int. Cl.$^7$ ............................................... G01S 13/93
(52) U.S. Cl. ........................... 342/70; 342/71; 342/72; 342/195; 701/301; 340/435; 340/436; 340/903
(58) Field of Search ............................. 342/70, 71, 72, 342/195; 340/435, 436, 903; 701/301

(56) References Cited

U.S. PATENT DOCUMENTS

| 3,697,985 | A | 10/1972 | Faris et al. |
| 3,935,559 | A | 1/1976 | Straffon et al. |
| 3,940,696 | A | 2/1976 | Nagy |

(List continued on next page.)

FOREIGN PATENT DOCUMENTS

| DE | 196 47 283 | 5/1997 |
| DE | 196 32 889 | 2/1998 |
| DE | 195 23 693 | 5/1998 |
| DE | 198 55 400 A1 | 12/1998 |
| DE | 198 50 128 | 5/1999 |
| EP | 0 398 712 A2 | 5/1990 |
| EP | 0 484 995 A2 | 5/1992 |
| EP | 0 642 190 A1 | 12/1993 |
| EP | 0 784 213 A2 | 1/1996 |
| EP | 0 887 658 | 12/1998 |
| EP | 0 932 052 | 7/1999 |
| EP | 0 978 729 A2 | 2/2000 |
| EP | 0 982 173 A2 | 3/2000 |
| EP | 1 020 989 A2 | 7/2000 |
| FR | 2 709 834 A1 | 9/1993 |
| FR | 2 709 834 | 3/1995 |

OTHER PUBLICATIONS

: Ferryman, Maybank and Worrall; "Visual Surveillance for Moving Vehicles;" Part of the Secure project funded by the DTI partners DERA, Lucas Industries and Jaguar; 8 pages.
International Search Report of PCT application No. PCT/US01/25676 dated Dec. 21, 2001.
International Search Report of PCT Application No. PCT/US01/25677 dated Apr. 17, 2002.
International Search Report of PCT Application No. PCT/US01/25638 dated May 7, 2002.

(List continued on next page.)

*Primary Examiner*—John B. Sotomayor
(74) *Attorney, Agent, or Firm*—Daly, Crowley & Mofford, LLP

(57) ABSTRACT

A near object detection (NOD) system includes a plurality of sensors, each of the sensors for providing detection coverage in a predetermined coverage zone. Each of the sensors includes a transmit antenna for transmitting a first RF signal, a receive antenna for receiving a second RF signal and a means for sharing the target data between each of the plurality of sensors in the NOD system.

22 Claims, 7 Drawing Sheets

U.S. PATENT DOCUMENTS

| | | |
|---|---|---|
| 3,978,481 A | 8/1976 | Angwin et al. |
| 4,003,049 A | 1/1977 | Sterzer et al. |
| 4,008,473 A | 2/1977 | Hinachi et al. |
| 4,008,475 A | 2/1977 | Johnson |
| 4,035,797 A | 7/1977 | Nagy |
| 4,063,243 A | 12/1977 | Anderson et al. ............ 342/373 |
| 4,079,377 A | 3/1978 | zur Heiden et al. |
| 4,143,370 A | 3/1979 | Yamanaka et al. |
| 4,209,791 A | 6/1980 | Gerst et al. ................. 342/442 |
| 4,217,582 A | 8/1980 | Endo et al. |
| 4,246,585 A | 1/1981 | Mailloux .................... 342/373 |
| 4,308,536 A | 12/1981 | Sims, Jr. et al. |
| 4,348,675 A | 9/1982 | Senzaki et al. |
| 4,349,823 A | 9/1982 | Tagami et al. |
| 4,414,550 A | 11/1983 | Tresselt ............... 343/700 MS |
| 4,507,662 A | 3/1985 | Rothenberg et al. ........ 342/376 |
| 4,543,577 A | 9/1985 | Tachibana et al. |
| 4,549,181 A | 10/1985 | Tachibana et al. |
| 4,622,636 A | 11/1986 | Tachibana |
| 4,673,937 A | 6/1987 | Davis |
| 4,703,429 A | 10/1987 | Sakata |
| 4,901,083 A | 2/1990 | May et al. |
| 4,962,383 A | 10/1990 | Tresselt ............... 343/700 MS |
| 4,970,653 A | 11/1990 | Kenue |
| 4,994,809 A | 2/1991 | Yung et al. |
| 5,008,678 A | 4/1991 | Herman ...................... 342/158 |
| 5,014,200 A | 5/1991 | Chundrlik et al. |
| 5,023,617 A | 6/1991 | Deering |
| 5,045,856 A | 9/1991 | Paoletti |
| 5,115,245 A | 5/1992 | Wen et al. |
| 5,134,411 A | 7/1992 | Adler |
| 5,138,321 A | 8/1992 | Hammer ...................... 342/36 |
| 5,173,859 A | 12/1992 | Deering |
| 5,189,426 A | 2/1993 | Asbury et al. |
| 5,235,316 A | 8/1993 | Qualizza |
| 5,249,027 A | 9/1993 | Mathur et al. |
| 5,249,157 A | 9/1993 | Taylor ........................ 340/903 |
| 5,268,692 A | 12/1993 | Grosch et al. |
| 5,280,288 A | 1/1994 | Sherry et al. |
| 5,285,207 A | 2/1994 | Asbury et al. |
| 5,302,956 A | 4/1994 | Asbury et al. |
| 5,315,303 A | 5/1994 | Tsou et al. |
| 5,325,096 A | 6/1994 | Pakett ........................ 342/70 |
| 5,325,097 A | 6/1994 | Zhang et al. |
| 5,339,075 A | 8/1994 | Abst et al. |
| 5,341,144 A | 8/1994 | Stove |
| 5,343,206 A | 8/1994 | Ansaldi et al. ............... 342/70 |
| 5,351,044 A | 9/1994 | Mathur et al. |
| RE34,773 E | 11/1994 | Dombrowski ............... 340/904 |
| 5,390,118 A | 2/1995 | Margolis et al. |
| 5,394,292 A | 2/1995 | Hayashida ................... 361/179 |
| 5,396,252 A | 3/1995 | Kelly .......................... 342/94 |
| 5,400,864 A | 3/1995 | Winner et al. |
| 5,410,745 A | 4/1995 | Friesen et al. ............... 455/341 |
| 5,414,643 A | 5/1995 | Blackman et al. ............ 342/95 |
| 5,451,960 A | 9/1995 | Kastella et al. ............... 342/59 |
| 5,454,442 A | 10/1995 | Labuhn et al. |
| 5,467,072 A | 11/1995 | Michael |
| 5,467,283 A | 11/1995 | Butsuen et al. |
| 5,471,214 A | 11/1995 | Faibish et al. |
| 5,479,173 A | 12/1995 | Yoshioka et al. ............ 342/70 |
| 5,481,268 A | 1/1996 | Higgins |
| 5,483,453 A | 1/1996 | Uemura et al. |
| 5,485,155 A | 1/1996 | Hibino |
| 5,485,159 A | 1/1996 | Zhang et al. |
| 5,486,832 A | 1/1996 | Hulderman |
| 5,493,302 A | 2/1996 | Woll et al. |
| 5,495,252 A | 2/1996 | Adler |
| 5,508,706 A | 4/1996 | Tsou et al. |
| 5,517,196 A | 5/1996 | Pakett et al. ................. 342/70 |
| 5,517,197 A | 5/1996 | Algeo et al. .................. 342/70 |
| 5,521,579 A | 5/1996 | Bernhard |
| 5,525,995 A * | 6/1996 | Benner ........................ 342/90 |
| 5,530,447 A | 6/1996 | Henderson et al. ........... 342/70 |
| 5,572,428 A | 11/1996 | Ishida et al. |
| 5,583,495 A | 12/1996 | Ben Lu lu |
| 5,587,908 A | 12/1996 | Kajiwara |
| 5,613,039 A | 3/1997 | Wang et al. .................. 706/24 |
| 5,619,208 A | 4/1997 | Tamatsu et al. ............... 342/70 |
| 5,625,362 A | 4/1997 | Richardson .................. 342/70 |
| 5,627,510 A | 5/1997 | Yuan ......................... 340/435 |
| 5,633,642 A | 5/1997 | Hoss et al. .................... 342/70 |
| 5,654,715 A | 8/1997 | Hayashikura et al. |
| 5,670,963 A | 9/1997 | Kubota et al. |
| 5,675,345 A | 10/1997 | Pozgay et al. ....... 343/700 MS |
| 5,678,650 A | 10/1997 | Ishihara et al. |
| 5,689,264 A | 11/1997 | Ishikawa et al. .............. 342/70 |
| 5,712,640 A | 1/1998 | Andou et al. |
| 5,717,399 A | 2/1998 | Urabe et al. |
| 5,731,778 A | 3/1998 | Nakatani et al. |
| 5,734,344 A | 3/1998 | Yamada |
| 5,757,074 A | 5/1998 | Matloubian et al. |
| 5,757,307 A | 5/1998 | Nakatani et al. .............. 342/70 |
| 5,767,793 A | 6/1998 | Agravante et al. |
| 5,771,007 A | 6/1998 | Arai et al. |
| 5,777,563 A | 7/1998 | Minissale et al. |
| 5,805,103 A | 9/1998 | Doi et al. |
| 5,808,561 A | 9/1998 | Kinoshita et al. |
| 5,808,728 A | 9/1998 | Uehara |
| 5,818,355 A | 10/1998 | Shirai et al. |
| 5,839,534 A | 11/1998 | Chakraborty et al. |
| 5,905,472 A | 5/1999 | Wolfson et al. |
| 5,923,280 A * | 7/1999 | Farmer ........................ 342/70 |
| 5,926,126 A | 7/1999 | Engelman .................... 342/70 |
| 5,929,802 A | 7/1999 | Russell et al. ................ 342/70 |
| 5,938,714 A | 8/1999 | Santonaka |
| 5,940,011 A | 8/1999 | Agravante et al. |
| 5,949,366 A | 9/1999 | Herrmann |
| 5,959,570 A | 9/1999 | Russell ........................ 342/70 |
| 5,977,904 A | 11/1999 | Mizuno et al. |
| 5,978,736 A | 11/1999 | Greendale |
| 5,999,092 A | 12/1999 | Smith et al. ................. 340/436 |
| 5,999,119 A | 12/1999 | Carnes et al. ................ 342/135 |
| 5,999,874 A | 12/1999 | Winner et al. ................ 701/93 |
| 6,011,507 A | 1/2000 | Curran et al. ................ 342/70 |
| 6,018,308 A | 1/2000 | Shirai |
| 6,026,347 A | 2/2000 | Schuster ..................... 701/301 |
| 6,026,353 A | 2/2000 | Winner |
| 6,028,548 A | 2/2000 | Farmer |
| 6,037,860 A | 3/2000 | Zander et al. ............... 340/436 |
| 6,037,894 A | 3/2000 | Pfizenmaier et al. |
| 6,040,796 A | 3/2000 | Matsugatani et al. |
| 6,043,772 A | 3/2000 | Voigtlaender et al. |
| 6,044,321 A | 3/2000 | Nakamura et al. ............ 701/96 |
| 6,049,257 A | 4/2000 | Hauk |
| 6,057,797 A | 5/2000 | Wagner |
| 6,069,581 A | 5/2000 | Bell et al. ..................... 342/70 |
| 6,070,682 A | 6/2000 | Isogai et al. |
| 6,075,492 A | 6/2000 | Schmidt et al. |
| 6,076,622 A | 6/2000 | Chakraborty et al. |
| 6,085,151 A | 7/2000 | Farmer et al. |
| 6,087,975 A | 7/2000 | Sugimoto et al. |
| 6,091,355 A | 7/2000 | Cadotte, Jr. et al. ........ 342/175 |
| 6,097,331 A | 8/2000 | Matsugatani et al. |
| 6,097,931 A | 8/2000 | Weiss et al. ................. 340/7.21 |
| 6,104,336 A | 8/2000 | Curran et al. ................ 342/70 |
| 6,107,956 A | 8/2000 | Russell et al. ................ 342/70 |
| 6,114,985 A | 9/2000 | Russell et al. .............. 342/169 |
| 6,127,965 A | 10/2000 | McDade et al. |
| 6,130,607 A | 10/2000 | McClanahan et al. ...... 340/436 |
| 6,147,637 A | 11/2000 | Morikawa et al. |

| | | |
|---|---|---|
| 6,147,638 A | 11/2000 | Rohling et al. |
| 6,154,168 A | 11/2000 | Egawa et al. |
| 6,161,073 A | 12/2000 | Tange et al. |
| 6,163,252 A | 12/2000 | Nishiwaki |
| 6,184,819 B1 | 2/2001 | Adomat et al. |
| 6,188,950 B1 | 2/2001 | Tsutsumi et al. |
| 6,198,426 B1 | 3/2001 | Tamatsu et al. |
| 6,198,434 B1 | 3/2001 | Martek et al. ............... 342/373 |
| 6,215,438 B1 | 4/2001 | Oswald et al. |
| 6,225,918 B1 | 5/2001 | Kam |
| 6,232,910 B1 | 5/2001 | Bell et al. |
| 6,233,516 B1 | 5/2001 | Egawa |
| 6,252,560 B1 | 6/2001 | Tanaka et al. ............... 343/853 |
| 6,255,984 B1 | 7/2001 | Kreppold et al. |
| 6,256,573 B1 | 7/2001 | Higashimata |
| 6,259,395 B1 | 7/2001 | Adachi et al. |
| 6,265,990 B1 | 7/2001 | Isogai et al. |
| 6,268,803 B1 * | 7/2001 | Gunderson et al. |
| 6,269,298 B1 | 7/2001 | Seto |
| 6,278,400 B1 | 8/2001 | Cassen et al. |
| 6,317,073 B1 | 11/2001 | Tamatsu et al. |
| 6,317,075 B1 | 11/2001 | Heide et al. |
| 6,317,090 B1 | 11/2001 | Nagy et al. |
| 6,320,547 B1 | 11/2001 | Fathy et al. |
| 6,327,530 B1 | 12/2001 | Nishimura et al. |
| 6,329,952 B1 | 12/2001 | Grace |
| 6,330,507 B1 | 12/2001 | Adachi et al. |
| 6,335,705 B1 | 1/2002 | Grace et al. |
| 6,338,011 B1 | 1/2002 | Furst et al. ..................... 701/1 |
| 6,345,227 B1 | 2/2002 | Egawa et al. |
| 6,351,702 B1 | 2/2002 | Tange et al. |
| 6,360,158 B1 | 3/2002 | Hanawa et al. ............... 701/93 |
| 6,366,235 B1 | 4/2002 | Mayer et al. |
| 2002/0044082 A1 * | 4/2002 | Woodington et al. ......... 342/70 |
| 2002/0049539 A1 * | 4/2002 | Russell et al. ............... 701/301 |
| 2002/0067287 A1 * | 6/2002 | Delcheccolo et al. ....... 340/901 |

OTHER PUBLICATIONS

International Search Report of PCT Application No. PCT/US01/42065 dated May 14, 2002.

International Search Report of PCT Application No. PCT/US01/25594 dated May 7, 2002.

International Search Report of PCT Application No. PCT/US01/25682 dated May 14, 2002.

G.S. Dow, et al. "Monolithic Receivers with Integrated Temperature Compensation Function", IEEE GaAs IC Symposium, 1991, pp. 267–269.

Barnett, Roy I. et al. "A Feasibility Study of Stripline–Fed Slots Arranged as a Planar Array with Circular Grid and Circular Boundary", IEEE, 1989, pp. 1510–1515.

Bhattacharyya, Arum, et al. "Analysis of Stripline–Fed Slot–Coupled Patch Antennas with Vias for Parallel–Plate Mode Suppression", IEEE Transcations on Antennas and Propagation, vol. 46, No. 4, Apr. 1998, pp. 538–545.

Clouston E.N. et al. "A Triplate Stripline Slot Antenna Developed for Time–Domain Measurements on Phased Arrays", 1998, pp. 312–315.

Das, Nirod K. et al. "Multiport Scattering Analysis of General Multilayered Printed Antennas Fed by Multiple Feed Ports: Part II–Applications", IEEE, 1992, pp. 482–491.

Katehi, Pisti B. et al. "Design of a Low Sidelobe Level Stripline Fed Slot Array Covered by a Dielectric Layer", 1989, pp. 978–981.

Kimura, Yuichi et al. "Alternating Phase Single–Layer Slotted Waveguide Arrays at 25GHz Band", IEEE, 1999, pp. 142–145.

Muir, A., "Analysis of Stripline/Slot Transition", Electronics Letter, vol. 26 No. 15, pp. 1160–1161.

Sakaibara, Kunio et al. "A Single Layer Slotted Waveguide Array for 22GHz Band Radio System Between Mobile Base Stations", IEEE, 1994, pp. 356–359.

Sangster, Alan et al. "A Moment Method Analysis of a Transverse Slot Fed by a Boxed Stripline", (No Date) pp. 146–149.

Schaubert, Daniel H. et al. "Moment Method Analysis of Infinite Stripline–Fed Tapered Slot Antenna Arrays with a Ground Plane", IEEE Transactions on Antennas and Propagation, vol. 42, No. 8, Aug. 1994, pp. 1161.

Smith, Peter "Transverse Slot Radiator in the Ground–Plane of Enclosed Stripline", 10th International Conference on Antennas and Propagation 14.17, Apr. 1997, 5 pages.

Theron, Isak Petrus et al. "On Slotted Waveguide Antenna Design at Ka–Band", IEEE Trans. vol. 32, Oct. 1984, pp. 1425–426.

* cited by examiner

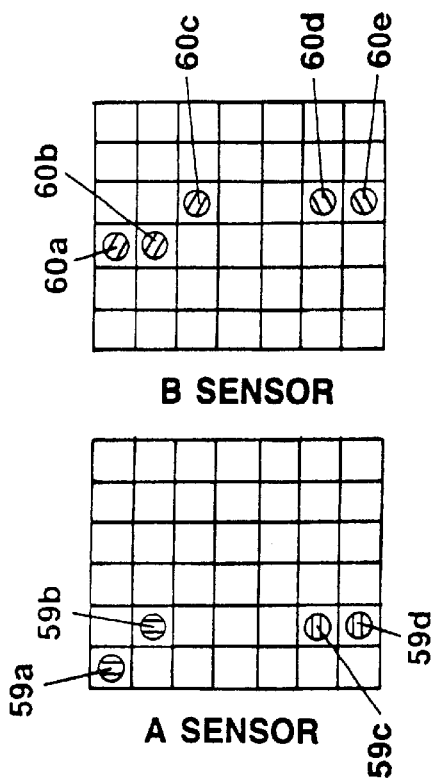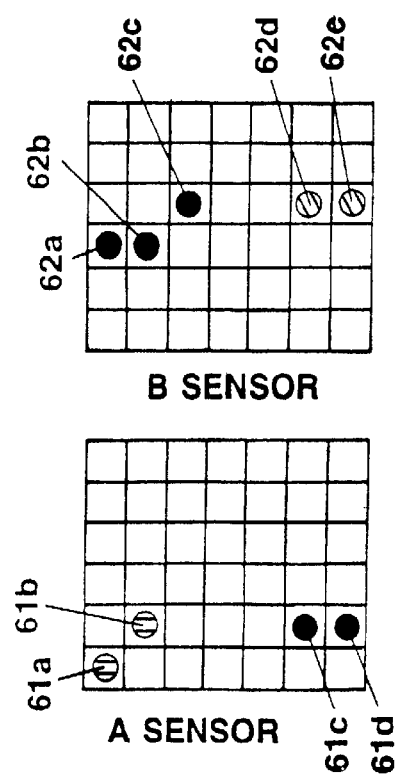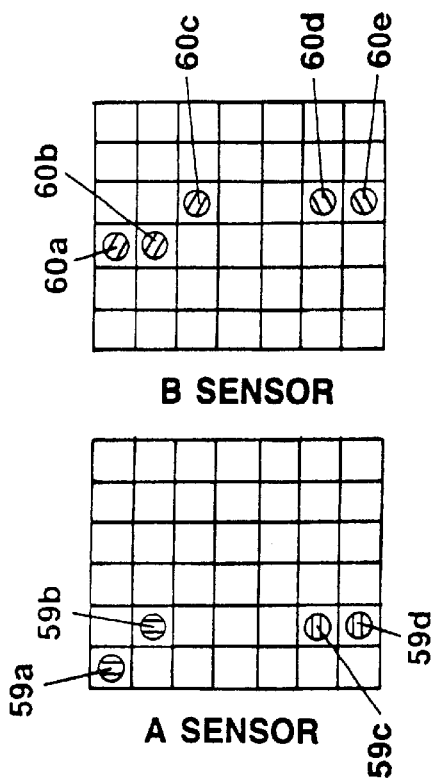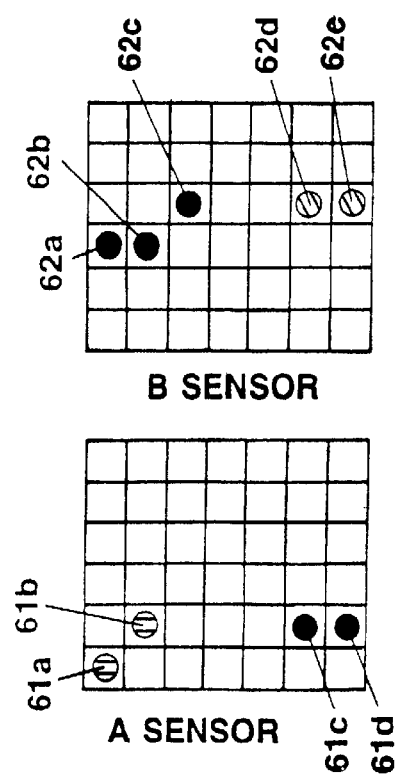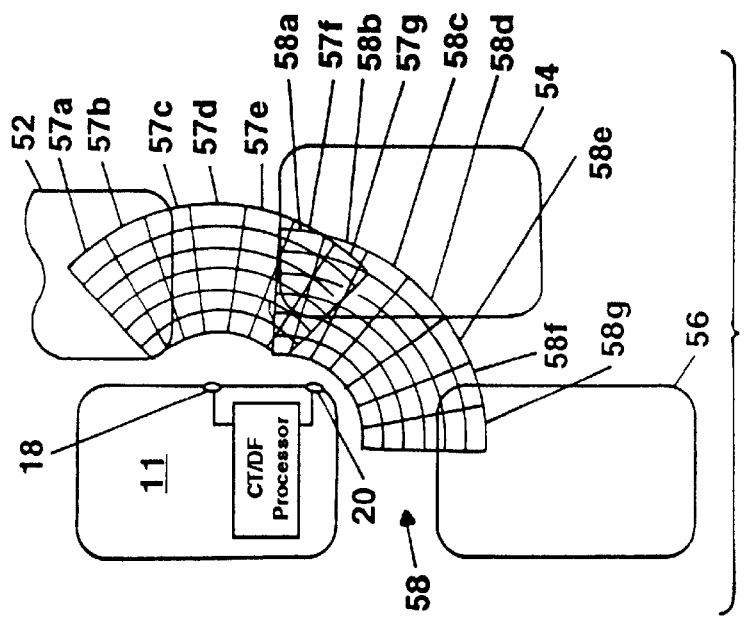

NEAR OBJECT DETECTION SYSTEM

CROSS-REFERENCE TO RELATED APPLICATIONS

This application is a continuation in part of, and claims the benefit of the filing date of co-pending U.S. patent application Ser. No. 09/931,631, entitled Near Object Detection System, filed Aug. 16, 2001, now issued which application claims priority under 35 U.S.C. §119(e) from application Ser. No. 60/226,160 filed Aug. 16, 2000. Both of these applications are incorporated herein by reference in their entirety.

STATEMENTS REGARDING FEDERALLY SPONSORED RESEARCH

Not applicable.

BACKGROUND OF THE INVENTION

In view of the dangers associated with automobile travel, there is an ongoing need for enhanced driver awareness. One possible area of increased driver awareness involves detection of objects around a vehicle. As the vehicle approaches objects (e.g. other cars, pedestrians and obstacles) or as objects approach the vehicle, a driver cannot always detect the object and perform intervention actions necessary to avoiding a collision with the object. For example a driver of a vehicle may not be able to detect an object in the so-called "blind spot" of the vehicle.

To enhance the situational awareness of trucks, for example, sensors or more simply "sensors" for detecting objects around a truck have been suggested. Such sensors typically include an optical or infrared (IR) detector for detecting obstacles in the path of the vehicle. In such an application, it is necessary to provide a sensor capable of accurately and reliably detecting objects in the path of the vehicle.

Radar is a suitable technology for implementing a sensor for use in vehicles such as automobiles and trucks. One type of radar suitable for this purpose is Frequency Modulated Continuous Wave (FMCW) radar. In typical FMCW radar, the frequency of the transmitted CW signal linearly increases from a first predetermined frequency to a second predetermined frequency. FMCW radar has the advantages of high sensitivity, relatively low transmitter power and good range resolution.

Aspects of the sensor which contribute to its accuracy and reliability include its susceptibility to noise and the overall precision with which received radio frequency (RF) signals are processed to detect objects within the field of view of the sensor. Susceptibility to noise for example can cause false detections, can cause inaccurate determination of range and position of the object and, even more deleteriously, cause an object to go undetected.

Further significant attributes of the sensor are related to its physical size and form factor. Preferably, the sensor is housed in a relatively small enclosure or housing mountable behind a surface of the vehicle. For accuracy and reliability, it is imperative that the transmit and receive antenna and circuitry of the sensor are unaffected by attributes of the vehicle (e.g. the vehicle grill, bumper or the like) and that the sensors are mounted to the vehicle in a predictable alignment.

It would, therefore, be desirable to provide a sensor system which is capable of detecting objects around a vehicle. It would also be desirable to provide a system which can be adapted to provide detection zones around vehicles of different sizes. It would be further desirable to provide a system which can be remotely re-programmed.

SUMMARY OF THE INVENTION

In accordance with the present invention, a near object detection (NOD) system includes a plurality of radio frequency (RF) transmit-receive (TR) sensor modules (or more simply "sensors") disposed about a vehicle such that one or more detection zones are deployed about the vehicle. In a preferred embodiment, the sensors are disposed such that each sensor detects object in one or more coverage zones which substantially surround the vehicle. First ones or the plurality of sensors can be mounted in rear and/or front bumpers of the vehicle while second ones of the sensors can be mounted in the side panels of the vehicle. Each of the sensors includes a sensor antenna system which comprises a transmit antenna for emitting or transmitting an RF signal and a receive antenna for receiving portions of the transmitted RF signal which are intercepted by one or more objects within a field of view of the transmit antenna and reflected back toward the receive antenna. Alternatively, a monostatic antenna can be used. The transmit antenna can be provided from a planar array of antenna elements while the receive antenna can be provided from a planar array of antenna elements or from a single row of antenna elements. That is, the transmit and receive antennas can be provided having different numbers and types of antenna elements. The NOD system further includes a receiver circuit, coupled to the receive antenna, for receiving signals from the receive antenna and for detecting the path or track of the one or more objects.

With this particular arrangement, a NOD system which detects objects in any region about a vehicle is provided. If one of the sensors determines that the vehicle is approaching an object or that an object is approaching the vehicle, then the sensor initiates steps which are carried out in accordance with a set of detection rules.

In one embodiment, the system is provided as a distributed processor system in which each of the sensors includes a processor. The sensors are each coupled together to allow the sensors to share information. In another embodiment, each of the sensors is coupled to a central sensor processor which receives information from each of the sensors and processes the information accordingly.

BRIEF DESCRIPTION OF THE DRAWINGS

The foregoing features of this invention, as well as the invention itself, may be more fully understood from the following description of the drawings in which:

FIG. 4 is a diagram of a vehicle surrounded by a plurality of targets with one target appearing in a sensor zone of two different sensors;

FIGS. 4A and 4B are a series of plots corresponding to radar reports in respective local coordinate systems of the two different sensors;

FIGS. 4C and 4D are a series of plots corresponding to fused radar reports from the two different sensors in FIGS. 4A and 4B shown in local coordinate systems corresponding to those of FIGS. 4A and 4B;

DETAILED DESCRIPTION OF THE INVENTION

Before describing the NOD system, some introductory concepts and terminology are explained. The term "sensor system" as used herein, refers to a system disposed on a vehicle, that can provide detections of objects, such as other vehicles or stationary objects, having a corresponding output that can indicate such detections. The term "sensor" will also be used herein to describe a sensor system. The sensor system, or the sensor, is distinguished from a near object detection (NOD) system that receives data from the variety of sensor systems and processes data from the variety of sensor systems in combination.

Figure 1:
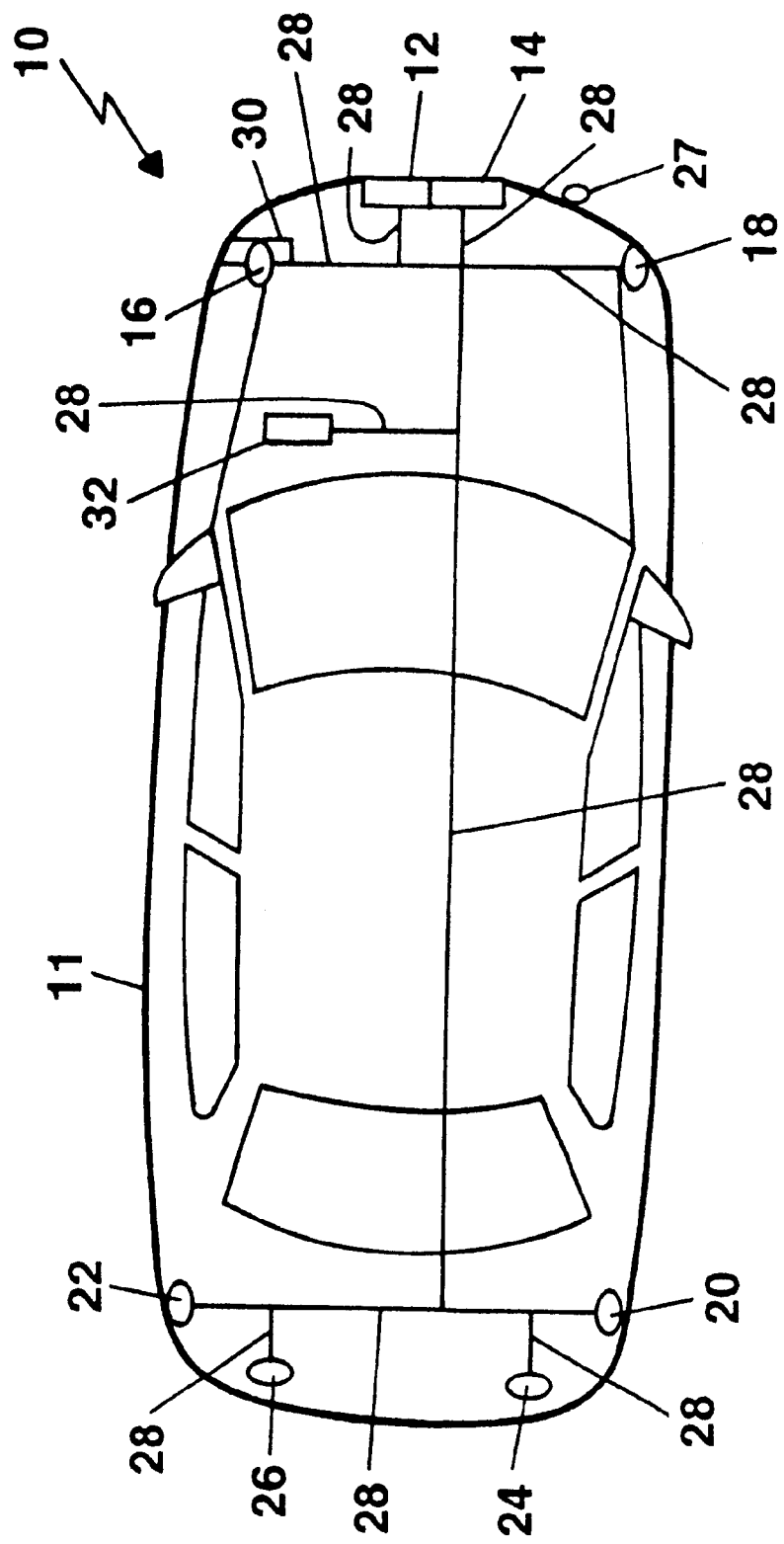
FIG. 1 is a block diagram of a near object detection (NOD) system disposed on a vehicle.

Referring now to FIG. 1, a near-object detection (NOD) system 10 is disposed on a vehicle 1. The vehicle 11 may be provided for example, as an automotive vehicle such as car, motorcycle, or truck, or a marine vehicle such as a boat or an underwater surface vehicle or as an agricultural vehicle such as a harvester. In this particular embodiment, the near-object detection system 10 includes a forward-looking sensor (FLS) 12 which may be of the type described in U.S. Pat. No. 5,929,802 entitled "Automotive Forward Looking Sensor Application," issued Jul. 27, 1999, assigned to the assignee of the present invention, an electro-optic system (EOS) sensor 14 which may be an infrared (IR) sensor, a plurality of side-looking sensor (SLS) systems 16–22 (also referred to as side object detection (SOD) systems 16–22) which may be of the type described in co-pending U.S. patent application Ser. No. 09/931,636, entitled "Radar Transmitter Circuitry and Techniques," filed Aug. 16, 2001, assigned to the assignee of the present invention and a plurality of rear-looking sensor (RLS) systems 24, 26. The sensors 12–26 may be coupled to the vehicle using a variety of techniques including but not limited to those described in co-pending U.S. patent application Ser. No. 09/930,868, entitled "System and Technique for Mounting a Radar System on a Vehicle," filed Aug. 16, 2001, assigned to the assignee of the present invention. The system 10 can also include a stop and go (SNG) sensor 27. It should be understood that the processing performed by the stop and go sensor 27 and detection zone provided by the sensor 27 can also be provided by the FLS 12 and thus sensor 27 can be omitted. In deciding whether to provide the stop and go processing function from FLS 12 or through a separate sensor (e.g. SNG sensor 27), a trade-off must be made. Exemplary trade off considerations include minimum and maximum desired detection range, zone edge tolerances and reaction time.

The FLS, EOS, SLS, RLS and SNG (if included) systems 12–27 are each coupled to a bus 28 which provides a communication path between each of the sensor systems 12–27. The bus 28 may be provided, for example, as a local area network (LAN) 28. In some embodiments, it may be desirable to provide the LAN 28 as a wireless LAN.

"Target track data," "track data," "target data," or equivalently "track information," as used herein, refer to data in a "track file" associated with an object, also referred to herein as a "target," such as another vehicle or a stationary object, that describes the path of the target in a coordinate system. The target track data can include past target track data corresponding to where the target has been, new target track data corresponding to where the target is now at a present data update, and predicted target track data corresponding to where the target is predicted to be at the present, and/or a future, target track data update.

It should be appreciated that system 10 is a real-time system and thus information should be exchanged/transferred between each of the sensors 12–27 and the processor 30 as rapidly as possible. Thus, bus 28 must be capable of supporting relatively high rates of data transfer.

For example, it may be desirable for bus 28 to have an average bus bandwidth of about 157 kbits per second plus additional for protocol overhead. This bandwidth is computed assuming that the transmit and receive antennas each have seven antenna beams and that each of the seven antenna beams has two (2) target tracks on average and that each track is reported at 14 Hz (min) at 100 bytes per track (7×2×14×100×8=157 kbits average bus bandwidth). Thus, although it is possible to have the sensors communicate through a conventional bus as are presently available on vehicles (e.g. the Car Area Network (CAN)), it may be desirable to provide bus 28 as a dedicated bus having at least if not more than the above noted average bus bandwidth.

Bus latency as used herein, refers to the difference in time between detection of an object by a sensor and reporting to the detection upon the bus 28. The bus latency should introduce only a relatively small time delay, for example a time delay corresponding to less than 0.5 meters of relative automobile movement. Relative movement as used herein, refers to relative movement in units of distance either between an automobile and a stationary object or between the automobile and a moving object, for example another moving automobile. Relative velocity as used herein is the velocity of the relative movement. A bus latency delay corresponding to 0.5 meters of automobile relative movement can be determined by selecting a maximum relative automobile speed, for example, 200 km/hr=125 mph=55.6 m/s. Thus, 0.5 meters of automobile relative movement divided by 55.6 m/s is approximately 9 ms, which is the corresponding maximum bus latency time delay. Assuming a bus clock frequency of 33 kHz, 9 ms is equivalent to approximately 300 clock cycles. In summary, for the selected maximum relative vehicle speed of about 200 km/hr, 0.5 meters of relative automobile movement corresponds to approximately 9 ms or approximately 300 clock cycles at a clock frequency of 300 KHz.

While particular parameters, including a particular relative automobile movement, a particular selected maximum relative automobile speed, and a particular clock frequency are described in the example above, it will be recognized that other parameters can be used with this invention. However, the parameters that describe the bus time latency should be selected in accordance with a variety of factors, including but not limited to an overall system response time which will allow the system to act upon the vehicle with warnings, braking, arming of airbags, or the like, with sufficient quickness so as to be useful. Other factors to consider can include fault tolerance, interference immunity, reliability, and cost.

The sensors are also coupled through the bus 28 to a central tracker/data fusion (CT/DF) processor 30 which will be described below in conjunction with FIGS. 4, 6 and 7. Suffice it here to say that CT/DF-processor 30 receives information provided thereto from each of the sensors 12–27 and provides information to each of the sensors 12–27. The sensors 12–27 utilize the information provided by the CT/DF processor 30 to improve the overall performance of the system 10 as will become apparent.

Also coupled to CT/DF processor 30 through the bus 28 is a human interface 32. The purpose of the interface 32 is to display or otherwise communicate (e.g. via audio or other signals) information collected by the sensors 12–27 to a driver or other occupant of the vehicle 11. The interface 32 may be provided, for example, as a heads-up display.

In this particular embodiment, the CT/DF processor 30 is shown as a single CT/DF processor which is provided as part of the sensor 16 to which each of the FLS, EOS, SLS, RLS and SNG systems 12–27 are coupled via the bus 28 or other means. It should be appreciated that in an alternate embodiment, one or more of the FLS, EOS, SLS, RLS and SNG systems 12–27 may include its own CT/DF processors to perform the processing required and to directly share information (e.g. transmit and receive information) with other ones of the sensors 12–27. In the case where it is desired to have redundancy in the CT/DF processing functions, it may be desirable to provide two of the sensors 12–27 with a CT/DF processor 30. In the case where each of the sensors 12–27 includes its own CT/DF system, the near-object detection system could be provided as a distributed processor system. The factors to consider when selecting between the distributed processor system and the single CT/DF processor include but are not limited to reliability, bus bandwidth, processing latency, and cost.

In one embodiment the CT/DF processor 30 provides specific information to specific ones of the sensors 12–27 and in other embodiments the CT/DF processor 30 provides all information to each of the sensors 12–27.

As shown in FIG. 1, at least one sensor 12–27 includes a central tracker data fusion (CT/DF) processor 30 and each of the sensors 12–27 send data over the bus 28 to the CT/DF processor 30. Regardless of whether the near-object detection system includes a single or multiple CT/DF processors 30, the information collected by each of the sensors 12–27 is shared and the CT/DF processor 30 (or processors in the case of a distributed system) implements a decision or rule tree. For example, the CT/DF processor 30 can be coupled to one or more vehicle safety systems, for example the airbag system. In response to signals from one or more of the FLS, EOS, SLS, and RLS systems, the sensor processor may determine that it is appropriate to "pre-arm" the airbag of the vehicle. Other examples include braking and steering systems, transmission control, alarms, horn and/or flasher activation.

The NOD system 10 may thus be coupled to a number of vehicle safety systems functions further described below. The CT/DF processor 30 receives all information provided thereto and optimizes performance of the NODS system for the entire vehicle.

The pair of RLS systems 24, 26 can utilize triangulation to detect objects in the rear portion of the vehicle. Location (distance and direction) of an object may be determined from a distance, or range, reading from each respective one of the pair of RLS systems 24, 26 without the need for any direction finding from either of the two sensors 24, 26 individually. To provide triangulation, two range circles can be provided, each respective range circle corresponding to the range provided by each respective one of the pair of RLS systems 24, 26, and each respective range circle having a radius equal to range. The two range circles thus provided can intersect at two ranges. One of the intersection range points corresponds to a range that is not possible since it is located inside the host 11. The other range point is selected, with location described by a range and a direction.

To provide the triangulation described above, the spacing of the sensors 24, 26 must be or known and must be sufficiently large to allow for a pre-determined maximum triangulation error in light of a range measurement accuracy provided by each of the sensors 24, 26. It will be recognized that because the separation of the RLS systems 24, 26 can be different on various vehicle types, of which vehicle 11 is but one example, some range calibration is required. However, the calibration can be pre-determined based upon the known separation.

It should be appreciated that one or more of the sensors 12–27 may be removably deployed on the vehicle 11. That is, in some embodiments the SLS, RLS, and FLS systems may be disposed external to the body of the vehicle (i.e. disposed on an exposed surface of the vehicle body), while in other systems one or more of the sensors 12–27 may be embedded into bumpers or other portions of vehicle (e.g. doors, panels, quarter panels, and vehicle front ends, and vehicle rear ends). Its is also possible to provide a system which is both mounted inside the vehicle (e.g., in the bumper or other location) and which is also removable.

Figure 2:
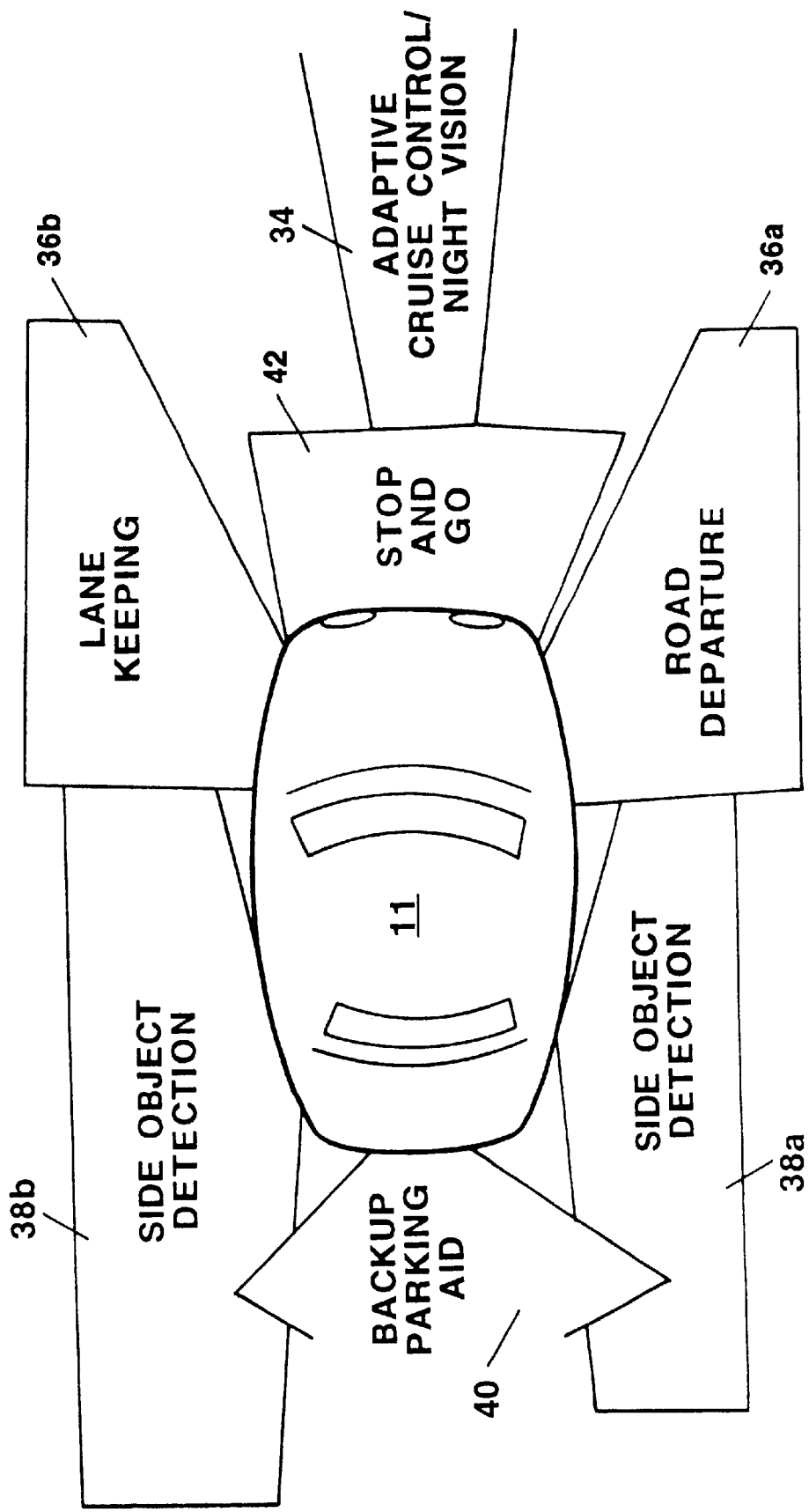
FIG. 2 is a diagram of vehicle surrounded by a cocoon of sensor zones provided from a NOD system of the type shown in FIG. 1.

Referring now to FIG. 2, in which like elements of FIG. 1 are provided having like reference designations, the vehicle 11 on which a NOD system is disposed is shown surrounded by a plurality of detection zones 32–40 which form a radar cocoon around the vehicle. It should be appreciated that different ones of the sensors 12–27 (FIG. 1) provide different ones of the detection zones 32–42. In particular, sensor 12 and 14 provide an adaptive cruise control and night vision zone 34, sensor 16 provides a lane keeping zone 36b, sensor 18 provides a road departure zone 36a, sensors 20, 22 provide side object detection zones 38a, 36a, sensors 20, 22 provide side object detection zones 38a, 38b respectively, sensors 24, 26 provide a backup and parking aid zone 40 and sensor 27 provides a stop and go zone 42. In an exemplary embodiment, the adaptive cruise control/night vision zone 34 has limited angular extent and is characterized by a long range (>50 m), to operate at high relative velocities. The road departure and lane keeping zones, 36a, 36b respectively, have shorter range and a wider angular extent, to operate at moderate range of relative velocities. The stop-and-go and back-up/parking aid zones 42, 40 have a wide angular extent but short range, to operate over a small range of relative velocities. The back-up/parking aid zone 40 can also provide rear collision warning information during normal driving conditions. The side object detection zones 38a, 38b have wide angular extent and relatively short range, to operate over a wide range of relative velocities.

It should also be appreciated that the size, shape and other characteristics of each of the sensor zones can be statically modified. The sensor zones can be statically modified, having pre-determined zone shapes determined by detection characteristics and radar beam angles associated with the sensors 12–27 (FIG. 1). There are many reasons for wanting to statically change one or more characteristics of a detection zone, including but not limited to the size or extent of the vehicle 11, and operator peripheral vision preference. Other possible reasons for wanting to change the detection zone size include towing a trailer, road lane size, and personal preference among vehicle operators.

The sensor zones can also be dynamically modified. Dynamic control can include, but is not limited to, a dwell on certain radar beams as described below in association with FIG. 7. Track hand-offs may allow sensors to respond quicker or more reliably given cue data by avoiding or reducing acquisition verification steps. Dynamic modification is further described below in association with FIG. 7.

Since the characteristics of a single sensor can be changed to allow the sensor to provide detection zones of different sizes and shapes, the sensor can also be used on a vehicle which is larger or smaller than the vehicle 11. Thus, modification of a coverage zone provided by a particular sensor can be accomplished by programming the sensor.

In one embodiment, the coverage zone can be modified by adjusting the range gates of the sensor as described in co-pending U.S. patent application Ser. No. 09/930,867, entitled "Technique for Changing a Range Gate and Radar Coverage," filed Aug. 16, 2001 assigned to the assignee of the present invention and incorporated herein by reference. In another embodiment, the coverage zone is changed by using a reconfigurable antenna. In still another embodiment, the reconfigurable antenna is provided by using microelectromechanical (MEMs) devices which are used to change beam shape and thus, beam coverage. The MEMS can change the aperture shape and thus, the shape of the beam.

It should be noted that with the particular configuration of sensors 12–27 shown in FIG. 1, seven coverage zones 32–40 are provided. In one particular embodiment, each of the coverage zones utilize radar sensor systems, also referred to as sensors and RF sensors herein. The radar sensor can utilize an antenna and beamforming system that provides multiple transmit and multiple receive beams in each of the coverage zones. In this manner, the particular direction in which another object, or target, is approaching the vehicle or viceversa can be found. In one particular embodiment, the FLS 12 (FIG. 1) can utilize an antenna system that includes eight separate transmit and receive antenna beams. The RF sensor system can operate in a manner similar to that described in the above-referenced U.S. Pat. No. 5,929,802. Similarly, the sensors 16–27 can utilize an antenna system that can include seven separate transmit and receive antenna beams. Sensors 16–27 (FIG. 1) can operate in a manner similar to that described in the above-reference U.S. patent application Ser. No. 09/931,636, entitled "Radar Transmitter Circuitry and Techniques." It should, however, be appreciated that radar sensor systems having any number of transmit and receive beams can be used with this invention.

Figure 3:
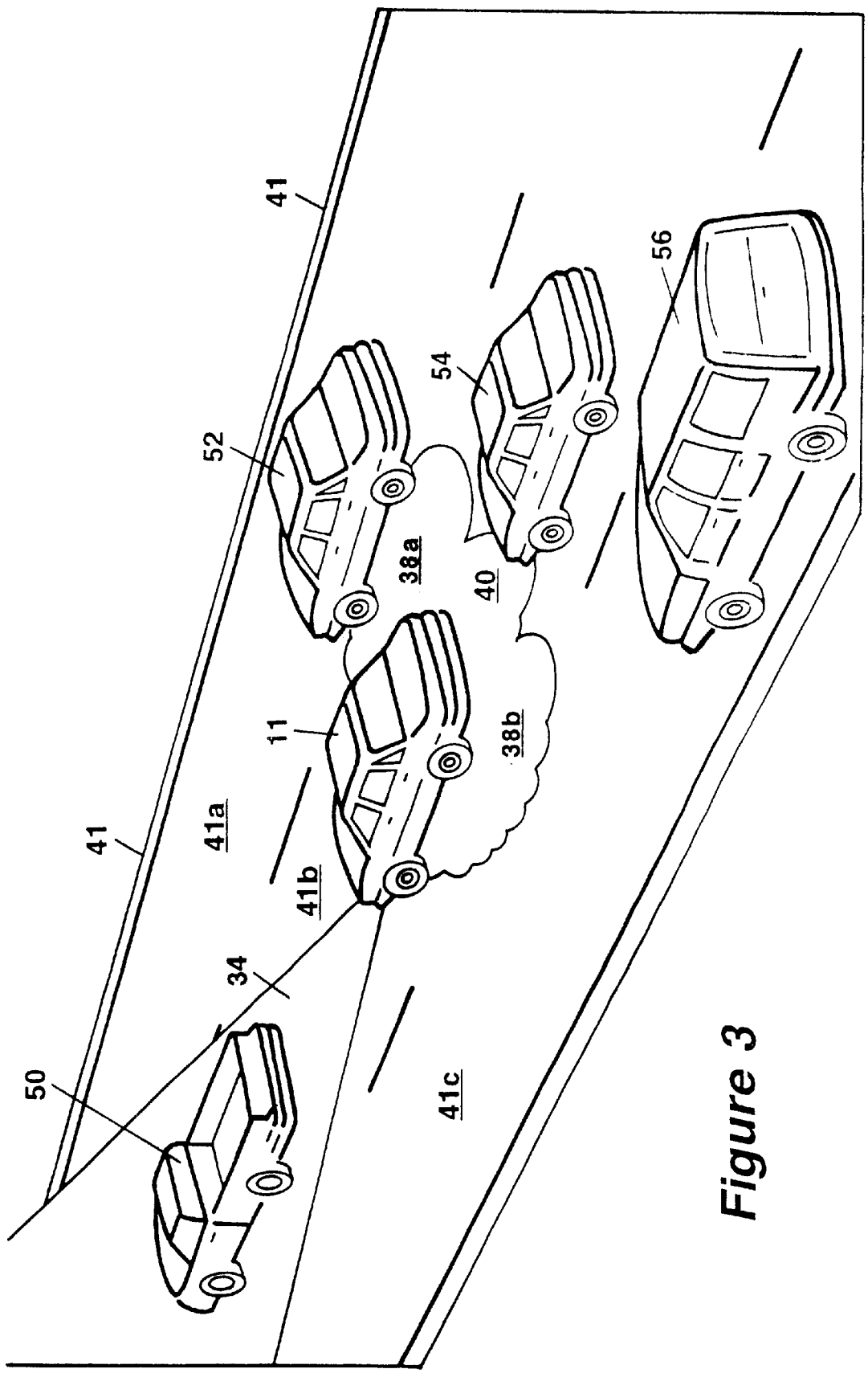
FIG. 3 is a diagram of a vehicle surrounded by a plurality sensor zones provided from a NOD system of the type shown in FIG. 1 and traveling a long a road with other vehicles in proximity to it.

Referring now to FIG. 3, a vehicle 11 having a NOD system disposed thereon travels on a road 41 having three lanes 41a, 41b, 41c. Vehicle 11 is in lane 41b and a first vehicle 50 is in front of the vehicle 11 and appears in detection zone 34. A second vehicle 52 is to the right of vehicle 11 in a first lane 41a and appears in detection zone 38a. A third vehicle 54 is behind vehicle 11 in a second lane 41b and appears in detection zone 40. A fourth vehicle 56 is behind and to the left of vehicle 11 in a third lane 41c. Since the fourth vehicle 56 is relatively far away from the first vehicle 11, the fourth vehicle 56 does not appear in any detection zone and thus is not sensed by the NOD system disposed on the first vehicle 11.

As shown in FIG. 3, the NOD system has identified three vehicles or targets 50, 52, 54 in proximity to the first vehicle 11. The NOD system maintains information on each target 50–54 and provides such information to a user (e.g. via display 32 in FIG. 1) or performs certain functions (e.g. pre-arm airbag system of the vehicle).

Furthermore, since the sensors 12–27 (FIG. 1) are in communication with CT/DF processor 30 (FIG. 1) and with each other, the sensors can share information about targets. For example, assume sensor 18 mounted on the first vehicle 11 detects the second vehicle 52 and begins to track the second vehicle 52. After a period of time the second vehicle 52 may begin to accelerate past the vehicle 11. If the sensor 18 is able to detect that second vehicle 52 will move past the first vehicle 11 on the right hand side, the sensor 18 can provide this information to the FLS 12. The information may be in the form of a public track file, or similar set of target data, that indicates a target, e.g. the second vehicle 52, in the vehicle's 11 global coordinate system. Such a track file allows the FLS 12 to have present and predicted target positional information before the FLS 12 can actually observe/detect the target, second vehicle 52.

Thus, the FLS 12 is provided advance track information, also referred to as "cue data" herein, about a confirmed target (i.e. a "real" target) prior to the FLS 12 itself actually providing target detection, acquisition, confirmation and tracking. The cue data is discussed further below in association with FIG. 5. Target detection, as used herein, refers to a process of distinguishing a target signal above an interference level based upon a threshold, where the target signal corresponds to back-scattered RF energy from the target, and the interference corresponds to noise and/or clutter. Target acquisition, as used herein, refers to a process of associating new target detections, and target position associated therewith, with existing target tracks corresponding to "track files." Target confirmation, as used herein, refers to a process of verifying that a detected target is real by application of a set rules, such as repeated target associations of the same track file on successive updates or with adjacent beams. Target tracking, as used herein, refers to the process of maintaining information about a target, such as position and velocity, from update to update, by associating new target detections with previous target detections, and by predicting and averaging a position state vector corresponding to the target position. These processes will be more fully understood when described in association with FIG. 7.

Providing the FLS 12 (FIG. 1) with advance information, or cue data, (e.g. the information that a confirmed target will be entering its field of view from the right hand side of the vehicle 11) may allow the FLS 12 to proceed to a target tracking process without first performing target detection, target acquisition, or target confirmation processes, or at least with a minimal amount of processing required to perform such processes. Since the FLS 12 can confirm the target and target track via the information from sensor 18 (FIG. 1) rather than by spending processing time confirming that the vehicle 52 is indeed a real target entering the field of view of the FLS 12, the FLS is able to perform more processing functions, such as tracking of multiple targets and other functions to be described below. Thus, providing advance information to the FLS allows the FLS 12 to more rapidly track a target and in particular allows the FLS 12 to more rapidly detect and track so-called "cut-in" targets (i.e. targets which quickly move into lane 41b in front of the vehicle 11).

More importantly perhaps, it is advantageous for the FLS 12 to have such advance knowledge since by providing the FLS 12 with information related to the path of target 52 prior to the target 52 entering the detection zone of the FLS 12, the FLS is able to initiate, or in some cases even to carry out, processes related to the engagement of vehicle safety systems including but not limited to pre-arming of air bags, automatic adjustment of automatic cruise control (ACC) systems and pre-arming braking systems. Thus the FLS 12 is able to execute other functions related to operation of the vehicle.

It should be appreciated that the CT/DF processor 30 (FIG. 1) is both a "target tracker" which performs a tracking function and a "data fuser" which performs a fusing function. The central tracking function of the CT/DF processor 30 is to receive and maintain all tracks from various sensors (e.g. sensors 12–27 in FIG. 1) in the system 10 (FIG. 1) and to also to aid other sensors in their performance as described above.

Referring now to FIGS. 4–4D, in FIG. 4 each of the radial sections 57a–g correspond to respective ones of the seven beams provided by the sensor 18 and each of the radial sections 58a–g correspond to respective ones of the seven beams provided by the sensor 20.

FIGS. 4A, 4C and 4B, 4D are rectangular graphical representations of detections provided by sensors 18, 20 respectively, in which the rows correspond to the seven beams of each respective sensor 18, 20 and the columns correspond to range cells. The dots in FIGS. 4A, 4B represent target detections in the seven beams of each respective sensor 18, 20. The dots in FIGS. 4C, 4D represent fused target detections associated with the seven beams of each respective sensor 18, 20. Thus, dots 59a and 59b, having first crosshatching, correspond to detections of target 52 in beams of sensor 18 that correspond to radial sections 57a, 57b respectively. Dots 59c and 59d, having second crosshatching, correspond to detections of target 54 in beams of the sensor 18 that correspond to radial sections 57f, 57g respectively. Dots 60a–60c, having third crosshatching, correspond to detections of target 54 in beams of sensor 20 that correspond to radial sections 58a–58c respectively. Dots 60d, 60e, having fourth crosshatching, correspond to detections of target 56 in beams of the sensor 20 that correspond to radial sections 58f, 58g respectively. Dots 61a, 61b, having the first crosshatching, correspond to fused detections of target 52 in beams of sensor 18 that correspond to radial sections 57a, 57b respectively. Dots 61c, 61d, having solid fill, correspond to fused detections of target 54 in beams of sensor 18 that correspond to radial sections 57f, 57g respectively, and dots 62a–62c, having the solid fill correspond to fused detections of target 54 in beams of sensor 20 that correspond to radial sections 58a–58c respectively and dots 62d, 62e, having the third crosshatching, correspond to fused detections of target 56 in beams of sensor 20 that correspond to radial section 58f, 58g respectively.

As described above, FIGS. 4A and 4B correspond to un-fused target data from sensors 18 and 20, respectively. FIGS. 4C and 4D correspond to fused target data from sensors 18 and 20, respectively, provided by the fusing function of the CT/DF processor 30 (FIG. 1). Each of the seven rows shown in FIGS. 4A, 4C correspond to a respective one of the seven beams associated with sensor 18. Similarly, each of the seven rows shown in FIGS. 4B, 4D correspond to a respective one of the seven beams associated with sensor 20. The fusing function corresponds to an association of the detections of a particular target provided by sensor 18 with those provided by sensor 20. Thus, data corresponding to dots 61c, 61d is associated with, or fused, with data corresponding to dots 62a–62c. The dots 61c–61d, 62a–62c are all shown having the solid fill to indicate that they are associated with the same target 54 and that the corresponding data from each of the two sensors 18, 20 has been fused. The dots 61a, 61b and 62d, 62e are shown having the same crosshatching as the corresponding un-fused dots 59a, 59b and 60d, 60e respectively, to indicate that the fusing has provided no target association between the respective sensors 18, 20. While FIGS. 4C and 4D are shown in the local coordinate systems of the respective sensors 18, 20, it will be apparent from discussions below that the data corresponding to dots 61a–61d and 62a–62e could also be shown in a global coordinate system. It will be recognized that a target detection and target track provided by two or more sensors with data thus fused is a detection having a higher probability of accuracy that a detection and target track provided by one sensor.

In operation, multiple ones of the sensors 12–27 (FIG. 1) can track the same target. As shown in FIG. 4 for example, the target 54 appears in the field of view of the sensor 18 and thus the sensor 18 can detect and track the target 54. Similarly, the target 54 is detected and tracked by the sensor 20 (FIG. 4). Therefore, both sensors 18 and 20 can detect and track the target 54. The data provided by sensors 18 and 20 corresponding to target 54 can be fused. The data thus fused provides a greater detection and tracking reliability than the data from one of the sensors 18,20.

Since the sensors 18 and 20 are located on different points of the vehicle 11, the sensors 18, 20 track the targets from two different aspect angles. Each of the sensors 18, 20 has its own unique local coordinate system. Having two different local coordinate systems, the sensors 18, 20 are unable to determine that they are each tracking the same target. To coordinate the detection and tracking data form each sensor 18, 2, each sensor 18, 20 provides its track information to the CT/DF processor 30 as a track file corresponding to the sensor 18, 20.

The CT/DF processor 30 is provided information which identifies the physical location on the vehicle 11 of each of the sensors 12–27. It will be recognized that the relative position of the sensors on a particular vehicle remains fixed, allowing the CT/DF processor 30 to transform target track data provided by each sensor in respective local coordinate systems to a vehicle global coordinate system.

Additionally, the CT/DF processor 30 can provide target track data that is transformed into the sensor local coordinate system of any particular sensor. The CT/DF processor 30 is thus able to transform track data associated with a local coordinate system provided thereto from each of the sensors 18, 20 to its own global coordinate system. Thus the CT/DF processor 30 views the position of each target detected by each of the sensors 18, 20 (and generally by any of the sensors 12–27) in a single coordinate system. It will be recognized that the radial segments 57a–57g correspond to the local coordinate system associated with sensor 18 and the radial segment 58a–58g correspond to the local coordinate system associated with sensor 20.

Since all target information appears in a single coordinate system, the CT/DF processor 30 (FIG. 1) can detect targets and generate corresponding target tracks with improved reliability; improved from those provided by each of the multiple sensors. The NOD system and the CT/DF processor 30 associated therewith is able to fuse data from each target track provided by each sensor (e.g. sensors 18, 20) into a common filter, or simply select the highest quality data (as determined by tracking noise, etc) to assist and improve upon the performance provided by an individual sensor.

The processes performed by the CT/DF processor 30 can include fusion of target data provided by a plurality of sensors. The fusion of target data can include transforming sensor target track data provided by the plurality of sensors in respective local coordinate systems, into track data in the global coordinate system. This can be accomplished by performing one or more coordinate transformations. Then, the CTIDF processor 30 associates the track data provided by each sensor with prior fused tracks to provide new fused track data.

The processes performed by the CT/DF processor 30 can also include "data association," which, as used herein, refers to the process of comparing 'new' track or position data having a first assumed quality (expected error statistics) with existing track data having a second assumed quality. New track data which is deemed likely to be consistent (correlate) with a track, i.e. new track data that has a small position difference when compared to the existing target track, is said to associate. The new position data is assumed to be from the same physical target as the track. New track data which is deemed unlikely to be consistent with a track, i.e., new data that has a large position difference when compared to the track, is said to not associate.

The processes performed by the CT/DF processor 30 can further include "recursively updating" positional tracks. In one such embodiment, the recursively updating of positional tracks is provided by a Kalman filter. A Kalman filter will be recognized to be a filter providing a positional state vector that describes a target position, that can be applied to an existing target track in combination with new track data. A Kalman filter can reduce tracking error by averaging associated state vector data from update to update. It should also be recognized that a state vector filter other than a Kalman filter can be used with this invention.

The processes performed by the CT/DF processor 30 can yet further include "track initiation" which, as used herein, refers to beginning a track file for new unassociated track data that does not associate with any existing track data. The unassociated track data is assumed to correspond to a new and previously untracked target. In this process, any detection not associated with an existing track is initialized by creating a new track file representing the detection. The new target is tracked on subsequent data updates. Similarly, the CT/DF processor 30 can drop, or delete, a track that moves out of view of a particular sensor. Any target having an existing track file that is not associated with new positional data at a data update is considered out of the field of view, and the track file is deleted such that it is no longer processed in subsequent updates. The processes performed by the CT/DF processor 30 will be further described in association with FIG. 7.

Figure 5:
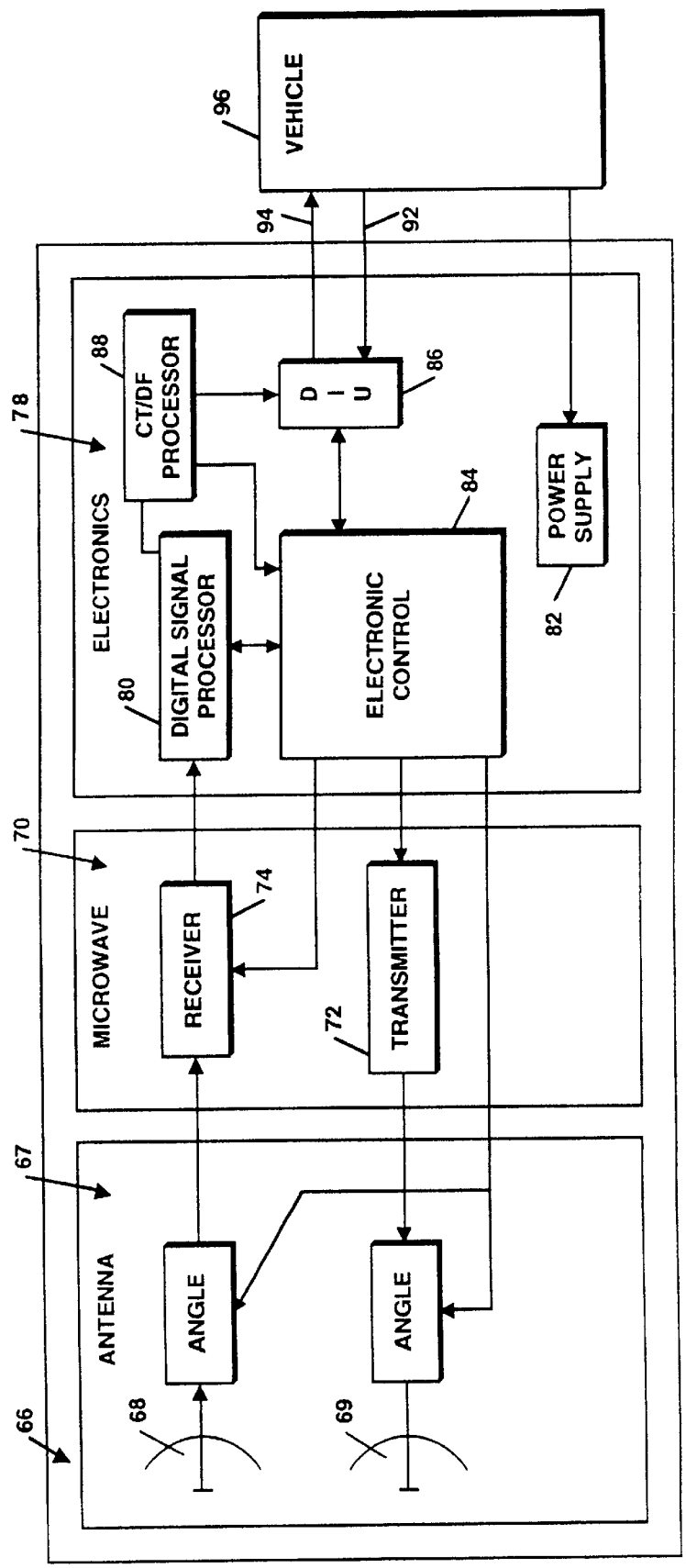
FIG. 5 is a block diagram of an near object detection (NOD) system having a central tracker/data fusion (CT/DF) processor.

Referring now to FIG. 5, a radar sensor 66 includes an antenna portion 67 having transmit and receive antennas 68, 69, a microwave portion 70 having both a transmitter 72 and a receiver 74, and an electronics portion 78 containing a digital signal processor (DSP) 80, a power supply 82, control circuits 84 and a digital interface unit (DIU) 86. The transmitter 72 includes a digital rarnp signal generator for generating a control signal for a voltage controlled oscillator (VCO), which may be provided for example as the type described in co-pending U.S. patent application Ser. No. 09/931,636, entitled "Radar Transmitter Circuitry and Techniques," filed on Aug. 16, 2001 and assigned to the assignee of the present invention.

The radar sensor 66 detects one or more objects, or targets, in the field of view of the sensor 66. In the illustrative embodiment, the radar sensor 66 may be a near object detection system such as NOD system 10 described above in conjunction with FIG. 1. In particular, radar sensor 66 is appropriate for use as a side object detection (SOD) module or sensor such as one of sensors 16–27 described above in conjunction with FIG. 1. As described above, such sensors are adapted for mounting on an automobile or other vehicle 96 for the purpose of detecting objects, including but not limited to other vehicles, trees, signs, pedestrians, and other objects which can be located proximate a path on which the vehicle is located. As will be apparent to those of ordinary skill in the art, the radar sensor 66 is also suitable for use in many different types of applications including but not limited to marine applications in which radar system 60 can be disposed on a boat, ship or other sea vessel.

In an exemplary embodiment, the transmitter 72 operates as a Frequency Modulated Continuous Wave (FMCW) radar, in which the frequency of the transmitted signal linearly increases from a first predetermined frequency to a second predetermined frequency. FMCW radar has the advantages of high sensitivity, relatively low transmitter power and good range resolution. However, it will be appreciated that other types of transmitters may be used.

Control signals are provided by the vehicle 96 to the radar system 60 via a control signal bus 92 and may include a yaw rate signal corresponding to a yaw rate associated with the vehicle 96 and a velocity signal corresponding to the velocity of the vehicle. The digital signal processor (DSP) 80 processes these control signals and radar return signals received by the radar sensor 66, in order to detect objects within the field of view of the radar sensor 66.

The radar sensor 66 further includes a CT/DF processor 88, that may be of the type of CT/DF processor 30 described in FIG. 1. The DSP 80 is coupled through the CT/DF processor 88 to a digital interface unit (DIU) 86. In other embodiments of the radar system 60 the CT/DF processor 88 may be omitted in which case the DSP 80 is directly coupled to the digital interface unit 86. The CT/DF processor 88 may be of the type described above in conjunction with FIGS. 1–3 and to be described further below. Thus the CT/DF processor 88 receives signals from DSP 80 and also receives information through the DIU 86 from other radar systems 66 disposed about the vehicle 96. The data provided to the CT/DF processor 88 by a radar sensor, for example respective ones of sensors 12–27 (FIG. 1), may be in the form of a track file, or raw detection data, in the local coordinate system of the sensor. The CT/DF processor 88 can also provide cue data, (anticipatory data), to the sensor, where the cue data is derived from detection of the target by other respective ones of the sensors 12–27 (FIG. 1). The cue data can provide the position of a target that is not yet in the field of view of the sensor but which is anticipated to be moving into the field of view.

The radar sensor 66 provides to the vehicle 96 one or more output signals characterizing an object within its field of view via an output signal bus 94 to the vehicle. These output signals can include track data having a range signal indicative of a range associated with the target, a range rate signal indicative of a range rate associated with the target, and an azimuth signal indicative of the azimuth associated with the target relative to the vehicle 96. The output signals may be coupled to a control unit (not shown) that can be further coupled to the safety systems of the vehicle 96, for various uses, for example, to provide an intelligent cruise control system or a collision warning system.

The antenna assembly 67 includes the receive antenna 68 for receiving RF signals and the transmit antenna 69 for transmitting RF signals. In this particular example, the radar sensor 66 corresponds to a bistatic radar system since it includes separate transmit and receive antennas positioned proximate one another. The antennas 68, 69 provide multiple transmit and receive beams at steering angles that are controlled in parallel as to point a transmit and a receive beam in the same direction. Various circuitry for selecting the angle of the respective antennas 68, 69 is suitable, including a multi-position switch. An appropriate antenna system may be provided for example as the type described in co-pending U.S. patent application Ser. No. 09/932,574, entitled "Switched Beam Antenna Architecture," filed on Aug. 16, 2001 and assigned to the assignee of the present invention.

Figure 6:
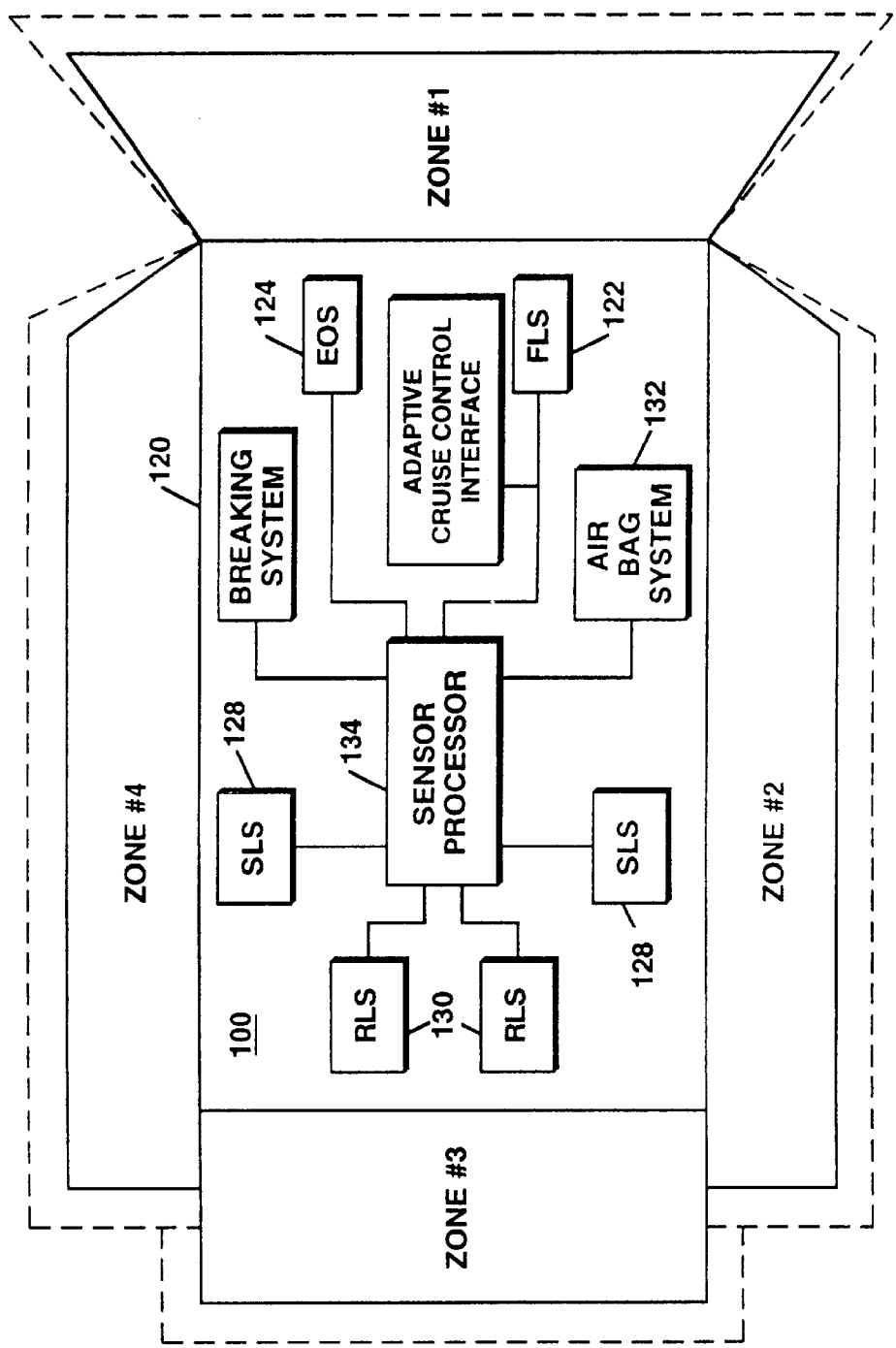
FIG. 6 is a block diagram of a near object detection (NOD) system disposed on a vehicle with the vehicle having a single sensor processing system.

Referring now to FIG. 6, an illustrative application for the radar system 10 of FIG. 1 is shown in the form of an automotive near object detection (NOD) system 100. The NOD system 100 is disposed on a vehicle 120 which may be provided for example, as an automotive vehicle such as car, motorcycle, or truck, or a marine vehicle such as a boat or an underwater vehicle or as an agricultural vehicle such as a harvester. In this particular embodiment, the NOD system 100 includes a forward-looking sensor (FLS) system 122, an Electro-Optic Sensor (EOS) system 124 that can provide image data, a plurality of side-looking sensor (SLS) systems 128 or equivalently side object detection (SOD) systems 128 and a plurality of rear-looking sensor (RLS) systems 130. In the illustrative embodiment, the radar system 10 of FIG. 1 which is shown in greater detail in FIG. 3 is a SOD system 128.

Each of the FLS, EOS, SLS, and RLS systems is coupled to a sensor processor 134. In this particular embodiment, the sensor processor 134 is shown as a central processor to which each of the FLS, EOS, SLS, and RLS systems is coupled via a bus or other means. It should be appreciated that in an alternate embodiment, one or more of the FLS, EOS, SLS, and RLS systems may include its own processors, such as the CT/DF processor 88 of FIG. 5, to perform the processing described below. In this case, the NOD system 100 would be provided as a distributed processor system.

Regardless of whether the NOD system 100 includes a single or multiple processors, the information collected by each of the sensors 122, 124, 128, 130 is shared and the sensor processor 134 (or processors in the case of a distributed system) implements a decision or rule tree. The NOD system 100 may be used for a number of functions including but not limited to blind spot detection, lane change detection, pre-arming of vehicle air bags and to perform a lane stay function. For example, the sensor processor 134 may be coupled to the airbag system of the vehicle 132. In response to signals from one or more of the FLS, EOS, SLS, and RLS systems, the sensor processor may determine that it is appropriate to "pre-arm" the airbag of the vehicle. Other examples are also possible.

The EOS system 124 can include an optical or IR sensor or any other sensor which provides relatively high resolution in the azimuth plane of the sensor. The pair of RLS systems 130 can utilize a triangulation scheme to detect objects in the rear portion of the vehicle. An exemplary FLS system 122 is described in the aforementioned U.S. Pat. No. 5,929,802. It should be appreciated that each of the SLS and RLS sensors may be provided having the same antenna system.

Each of the sensors is disposed on the vehicle 120 such that a plurality of coverage zones exist around the vehicle. Thus, the vehicle is enclosed in a cocoon-like web or wrap of sensor zones. With the particular configuration shown in FIG. 6, four coverage zones 68a–68d are provided. Each of the coverage zones 68a–68d utilizes one or more RF detection systems. The RF detection system utilizes an antenna system which provides multiple beams in each of the coverage zones 68a–68d. In this manner, the particular direction from which another object approaches the vehicle or vice-versa can be found. One particular antenna which can be used is described in U.S. patent application Ser. No. 09/931,633, entitled "Slot Antenna Element for an Array Antenna," filed Aug. 16, 2001 and the U.S. patent application Ser. No. 09/932,574, entitled "Switched Beam Antenna Architecture," filed Aug. 16, 2001 each of which are assigned to the assignee of the present invention.

It should be appreciated that the SLS, RLS, and the FLS systems can be removably deployed on the vehicle. That is, in some embodiments the SLS, RLS, and FLS sensors can be disposed external to the body of the vehicle (i.e. on an exposed surface of the vehicle body), while in other systems the SLS, RLS, and FLS systems may be embedded into bumpers or other portions of vehicle (e.g. doors, panels, quarter panels, vehicle front ends, and vehicle rear ends). It is also possible to provide a system which is both mounted inside the vehicle (e.g., in the bumper or other location) and which is also removable. The system for mounting can be of a type described in U.S. patent application Ser. No. 09/930,868, entitled "System and Technique for Mounting a Radar System on a Vehicle," filed Aug. 16, 2001 and assigned to the assignee of the present invention, and these applications are incorporated by reference herein.

Figure 7:
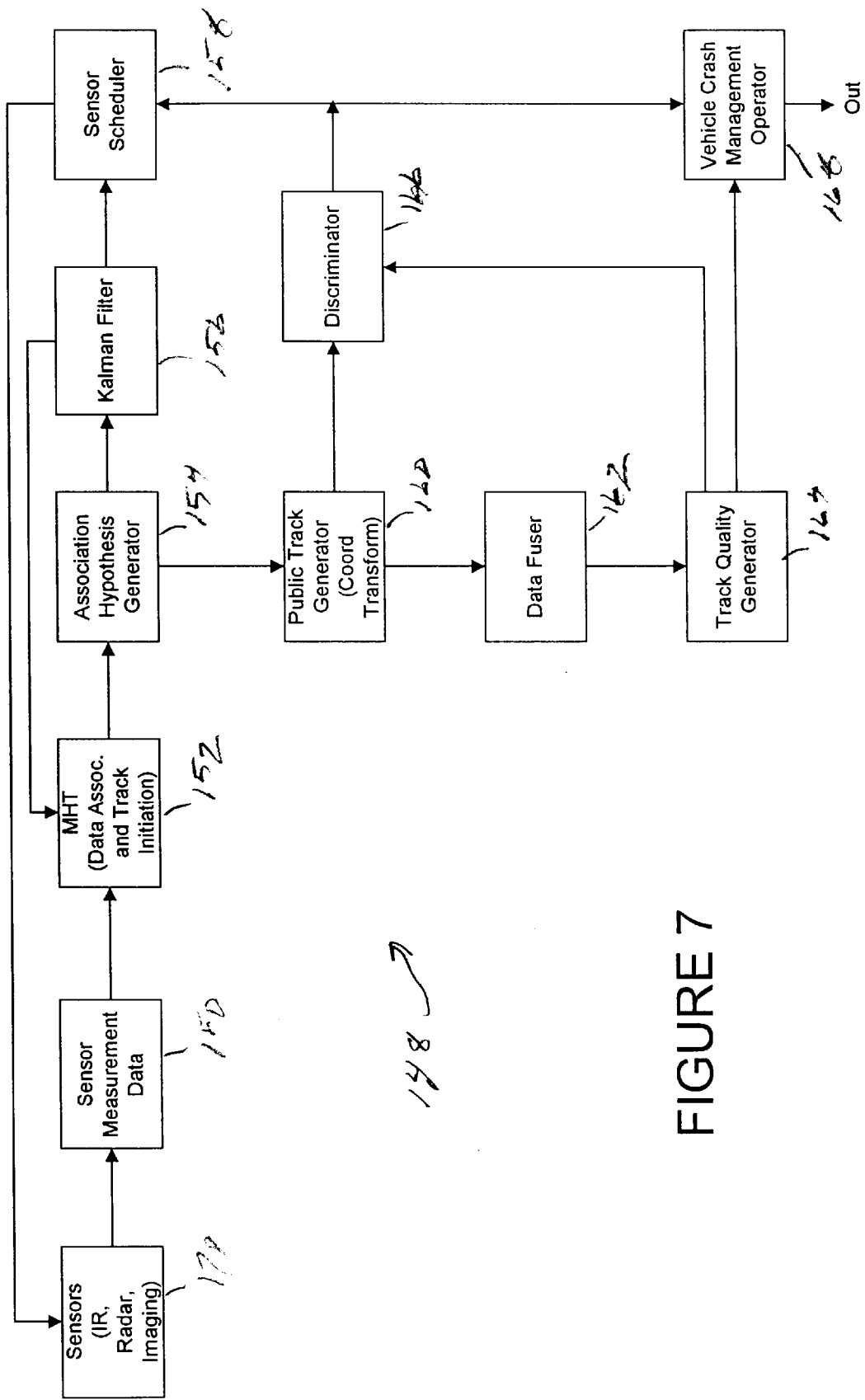
FIG. 7 is a block diagram of an exemplary set of processing elements that can be provided by a CT/DF processor.

Referring now to FIG. 7, an exemplary set of elements 148 that can be provided by a CT/DF processor, such as CT/DF processor 30 (FIG. 1), CT/DF processor 88 (FIG. 4) or sensor processor 134 (FIG. 5), include sensor measurement data at block 150. The sensor measurement data 150 includes imaging measurement data from infrared (IR) sensors and radar data from radar sensors, provided by sensors such as the sensors 12–27 described above in conjunction with FIG. 1. The sensor data is provided in respective local coordinate systems as described above in association with FIG. 4. The sensor data is then provided to a Multiple Hypothesis Tracker (MHT) 152 for data association of new track data provided by the sensors 170 in the respective local coordinate system associated with each track. In the case where a new target is detected and no track file exists for the new target, the MHT initiates a new track for each new target. Track initiation and data association are described above in association with FIG. 4.

The MHT 152 will be recognized to provide a reduced probability of false track determination. The MHT 152 considers multiple possible hypotheses for data association of new track data provided by the various sensors, e.g. sensors 12–27 (FIG. 1), based on multiple measurements. The MHT 152 selects the most probable hypothesis, i.e., the most probable association of new track data with each existing track.

An association hypothesis generator 154 generates hypotheses about data association, resolution, and data quality. Furthermore, the association hypotheses are tailored. The tailoring process is intended to reduce the total number of hypotheses for computational efficiency. Tailoring can include, but is not limited to, eliminating low probability hypotheses and combining correlated hypotheses.

The track data is received by a Kalman filter 156, or any similar state prediction filter. Remembering from above that track data can be existing, new, or future predicted track data, the output provided by the Kalman filter is a state vector prediction that provides target track predictions that describe likely future track data associated with each target track. The state vector predictions can include a variety of factors, including but not limited to a target position and a target velocity. The state vector predictions provided by the Kalman filter 156 are then provided back to the MHT 152 to be used as one of the multiple hypotheses, i.e., to provide a hypothesis associated with new track data points provided by the sensors. The state vector predictions are used both for filter averaging executed at Kalman filter 156 and for associating new track data with existing tracks at the MHT 152 in order to attain a high probability of successful target tracking from update to update.

Processing then proceeds to public track generator 160 where "public tracks," or "public track files," are formed. Public tracks are tracks generated from the track data provided by any of the sensors 170, e.g. sensors 12–27 (FIG. 1), through the MHT 152 for track associations, and through the association hypothesis generator 154 for association improvement. Forming the public tracks includes transforming the track data provided in a local coordinate systems by the association hypothesis generator 154 to track data in the vehicle global coordinate system as described above. Data from public tracks can ultimately provide information for sensor operation/resource scheduling provided by the sensor scheduler 158. The public track generator 160 provides target tracks associated with one or more sensors, e.g. sensors 12–27 of FIG. 1, for each target, in the vehicle global coordinate system.

The public track data is provided to a data fuser 162. The data fuser 162 fuses the public tracks by associating track files provided by the multiple sensors, e.g. sensor 12–27 (FIG. 1), for the current update and from the previous update. Data fusing is described above more fully in association with FIGS. 4–4D.

The fused public track files are then provided to a track quality generator 164 The fused public track files are compared to determine the highest quality track files based on factors including, but not limited to, the lowest track data variance, track file age, and history of missed detections or associations.

The track files provided by the track quality generator 164 are received by a discriminator 166. The discriminator 166 evaluates the road scene, i.e., all detection tracks, by interpreting the data output from the track quality generator 164. The discriminator 166 provides processes including, but not limited to, discerning target size to identify large extended targets such as trailers that produce multiple track files, identifying potential hazards such as blind zone detection, and determining if sensor cueing is applicable. Cue data is described above.

The discriminator 166 also receives the associated public tracks sent from the public track generator 160, determines if any changes in the radar scheduling are required, and provides scheduling and cueing information to the sensor scheduler 158. Scheduling information can include a variety of factors, including factors that can cause a sensor to provide a dwell at certain radar beams if a target is detected within those beams and the target is deemed to represent a significant hazard condition. The scheduling information provided by the discriminator 166 can also include information that can cause a sensor to begin to process data from a particular radar beam if cued data from another sensor is associated with that radar beam. Cueing information can cause adaptation of a particular sensor to point radar beams predominantly in a direction from which a target is predicted by another sensor to appear.

The sensor scheduler 158 receives information from the discriminator 166 and notifies the sensors 170 when the sensors should provide track data updates to the MHT 150, notifies the various sensors of beam dwells that should be generated and notifies the sensors of any appropriate cue data.

The data tracks from the track quality generator 164 are received by a vehicle control crash management operator 168. Based on the evaluation of the road scene provided by the discriminator 166 and the best quality tracks provided by the track quality generator 164, the vehicle control crash management operator 168 can execute a variety of output functions associated with safety systems coupled to the vehicle as described above.

While a particular exemplary embodiment has been shown and described above that provides a fusing of data provided by a variety of sensors disposed upon a vehicle, it should be understood that other embodiments that fuse the sensor data are possible with the present invention. Other embodiments include, but are not limited to, filters other than the Kalman filters 156, and other sequences of the blocks 150–170.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A near object detection system comprising:
    a plurality of target sensors coupled to a vehicle, each of the target sensors for providing range cell data having local coordinates associated with each respective target sensor; and
    a processor coupled to receive the range cell data having local coordinates and to process the range cell data in a vehicle global coordinate system.

2. The system of claim 1, wherein the processor comprises:
    a combiner for combining track files generated by respective ones of the plurality of target sensors.

3. The system of claim 1, wherein the processor comprises:
    a multi-hypothesis tracker (MHT) adapted to receive the range cell data provided by the one or more target sensors;
    an association hypothesis generator coupled to the MHT;
    a state variable filter coupled to the association hypothesis generator and further coupled to the MHT;
    a public track generator coupled to the association hypothesis generator, wherein the public track generator transforms the local coordinates of positional tracks associated with targets to a vehicle global coordinate system;
    a data fuser coupled to the public track generator, wherein the data fuser combines the data tracks associated with each of the plurality of target sensors to provide fused public tracks;
    a track quality generator coupled to the data fuser, wherein the track quality generator determines data quality values associated with the fused public tracks;
    a discriminator coupled to the public track generator and to the track quality generator, wherein the discriminator provides sensor scheduling information; and
    a vehicle crash management operator coupled to the track quality generator and to the discriminator, wherein the vehicle crash management operator provides control actions to vehicle systems.

4. The system of claim 3, wherein the state variable filter includes a Kalman filter.

5. The system of claim 3, further comprising:
a sensor scheduler coupled to the discriminator and to at least one of the plurality of target sensors, wherein the sensor scheduler provides an update schedule associated with range cell data updates provided by the plurality of target sensors.

6. The system of claim 5, wherein the sensor scheduler further provides a beam dwell associated with at least a respective one of the plurality of sensors.

7. A near object detection system comprising:
a plurality of target sensors coupled to a vehicle, each of the target sensors for providing target data, wherein the target sensors include at least one of: an infrared (IR) sensor and a radar sensor;
a processor for receiving the target data, processing the data and providing a processor output coupled to one or more vehicle safety systems; wherein the processor includes a combiner for combining track files generated by respective ones of the plurality of target sensors.

8. A near object detection system comprising:
a plurality of target sensors coupled to a vehicle, each of the target sensors for providing target data, wherein the target sensors include at least one of: an infrared (IR) sensor and a radar sensor; and
a processor for receiving the target data, processing the data and providing a processor output coupled to one or more vehicle safety systems, wherein the processor includes:
a multi-hypothesis tracker (MHT) adapted to receive the target data provided by the one or more target sensors;
an association hypothesis generator coupled to the MHT;
a state variable filter coupled to the association hypothesis generator and further coupled to the MHT;
a public track generator coupled to the association hypothesis generator, wherein the public track generator transforms the local coordinates of positional tracks associated with targets to a vehicle global coordinate system;
a data fuser coupled to the public track generator, wherein the data fuser combines the data tracks associated with each of the plurality of target sensors to provide fused public tracks;
a track quality generator coupled to the data fuser, wherein the track quality generator determines data quality values associated with the fused public tracks;
a discriminator coupled to the public track generator and to the track quality generator, wherein the discriminator provides sensor scheduling information; and
a vehicle crash management operator coupled to the track quality generator and to the discriminator, wherein the vehicle crash management operator provides control actions to the vehicle safety systems.

9. The system of claim 8, wherein the state variable filter includes a Kalman filter.

10. The system of claim 8, further comprising:
a sensor scheduler coupled to the discriminator and to at least one of the plurality of target sensors, wherein the sensor scheduler provides an update schedule associated with target data updates provided by the plurality of target sensors.

11. The system of claim 10, wherein the sensor scheduler further provides a beam dwell associated with the radar sensor.

12. A near object detection method comprising:
target tracking with a plurality of target sensors coupled to a vehicle, which provide range cell data having local coordinates associated with each respective target sensor; and
sharing the target data provided by each of the plurality of target sensors in a processor coupled to receive and process the range cell data in a vehicle global coordinate system.

13. The method of claim 12, wherein the sharing the target data comprises:
combining track files generated by respective ones of the plurality of target sensors.

14. The method of claim 12, wherein the sharing the target data comprises:
comparing track hypotheses with a multi-hypothesis tracker (MHT) adapted to receive the range cell data provided by the one or more target sensors;
testing track hypotheses with an association hypothesis generator coupled to the MHT;
filtering with a state variable filter coupled to the association hypothesis generator and further coupled to the MHT;
generating public tracks with a public track generator coupled to the association hypothesis generator, wherein the public track generator transforms the local coordinates of positional tracks associated with targets to a vehicle global coordinate system;
data fusing with a data fuser coupled to the public track generator, wherein the data fuser combines the target data associated with each of the plurality of target sensors to provide fused public tracks;
generating track quality values with a track quality generator coupled to the data fuser, wherein the track quality generator determines data quality values associated with the fused public tracks;
discriminating with a discriminator coupled to the public track generator and to the track quality generator, wherein the discriminator provides sensor scheduling information; and
controlling actions of safety systems coupled to the vehicle with a vehicle crash management operator coupled to the track quality generator and to the discriminator, wherein the vehicle crash management operator provides control actions to vehicle systems.

15. The method of claim 14, wherein the state variable filter is a Kalman filter.

16. The method of claim 14, further comprising:
scheduling the target sensors with a sensor scheduler coupled to the discriminator and to at least one of the plurality of target sensors, wherein the sensor scheduler provides an update schedule associated with target data updates provided by the plurality of target sensors.

17. The method of claim 16, further comprising:
generating with the sensor scheduler, a beam dwell associated with the radar sensor.

18. A near object detection method comprising:
target tracking with a plurality of target sensors coupled to a vehicle, each of the target sensors for providing detection coverage in a predetermined coverage zone, and each of which provides target data, wherein the target tracking includes at least one of: imaging with an infrared (IR) sensor; and radar sensing with a radar sensor; and
sharing the target data provided by each of the plurality of target sensors in a processor to provide a processor output coupled to one or more vehicle safety systems, wherein the sharing the target data includes combining track files generated by respective ones of the plurality of target sensors.

19. A near object detection method comprising:

target tracking with a plurality of target sensors coupled to a vehicle, each of the target sensors for providing detection coverage in a predetermined coverage zone, and each of which provides target data, wherein the target tracking includes at least one of: imaging with an infrared (IR) sensor; and radar sensing with a radar sensor; and sharing the target data provided by each of the plurality of target sensors in a processor to provide a processor output coupled to one or more vehicle safety systems, wherein the sharing the target data includes:

comparing track hypotheses with a multi-hypothesis tracker (MHT) adapted to receive the target data provided by the one or more target sensors;

testing track hypotheses with an association hypothesis generator coupled to the MHT;

filtering with a state variable filter coupled to the association hypothesis generator and further coupled to the MHT;

generating public tracks with a public track generator coupled to the association hypothesis generator, wherein the public track generator transforms the local coordinates of positional tracks associated with targets to a vehicle global coordinate system;

data fusing with a data fuser coupled to the public track generator, wherein the data fuser combines the target data associated with each of the plurality of target sensors to provide fused public tracks;

generating track quality values with a track quality generator coupled to the data fuser, wherein the track quality generator determines data quality values associated with the fused public tracks;

discriminating with a discriminator coupled to the public track generator and to the track quality generator, wherein the discriminator provides sensor scheduling information; and controlling actions of safety systems coupled to the vehicle with a vehicle crash management operator coupled to the track quality generator and to the discriminator, wherein the vehicle crash management operator provides control actions to the vehicle safety systems.

20. The method of claim 19, wherein the state variable filter is a Kalman filter.

21. The method of claim 19, further comprising:

scheduling the target sensors with a sensor scheduler coupled to the discriminator and to at least one of the plurality of target sensors, wherein the sensor scheduler provides an update schedule associated with target data updates provided by the plurality of target sensors.

22. The method of claim 21, further comprising:

generating with the sensor scheduler, a beam dwell associated with the radar sensor.

* * * * *

UNITED STATES PATENT AND TRADEMARK OFFICE
CERTIFICATE OF CORRECTION

PATENT NO. : 6,670,910 B2
DATED : December 30, 2003
INVENTOR(S) : Michael Joseph Delcheccolo et al.

It is certified that error appears in the above-identified patent and that said Letters Patent is hereby corrected as shown below:

Column 1,
Line 8, delete "near" and replace with -- "Near --.
Line 9, delete "System," and replace with -- System", --.
Line 27, delete "avoiding" and replace with -- avoid --.

Column 2,
Line 12, delete "detects object" and replace with -- detects the object --.

Column 3,
Line 28, delete "vehicle 1" and replace with -- vehicle 11 --.
Line 59, delete "trade off" and replace with -- trade-off --.

Column 7,
Line 34, delete "viceversa" and replace with -- vice versa --.
Line 42, delete "reference" and replace with -- referenced --.

Column 8,
Line 29, delete "set rules" and replace with -- set of rules --.
Line 39, delete "right hand side" and replace with -- right-hand side --.

Column 9,
Line 7, delete "to also to" and replace with -- also to --.
Line 44, delete "section" and replace with -- sections --.

Column 10,
Line 25, delete "18,2" and replace with -- 18, 20 --.
Line 56, delete "etc)" and replace with -- etc.) --.

Column 13,
Line 9, delete "as car," and replace with -- as a car, --.

UNITED STATES PATENT AND TRADEMARK OFFICE
CERTIFICATE OF CORRECTION

PATENT NO. : 6,670,910 B2
DATED : December 30, 2003
INVENTOR(S) : Michael Joseph Delcheccolo et al.

It is certified that error appears in the above-identified patent and that said Letters Patent is hereby corrected as shown below:

<u>Column 14,</u>
Line 11, delete "of vehicle" and replace with -- of the vehicle --.

Signed and Sealed this

Twenty-ninth Day of June, 2004

JON W. DUDAS
*Acting Director of the United States Patent and Trademark Office*